Jan. 11, 1955  H. ZWEIGBAUM  2,699,547
SENSITIVITY DETERMINATION FOR DOPPLER TYPE RADAR SYSTEMS
Filed Aug. 7, 1953
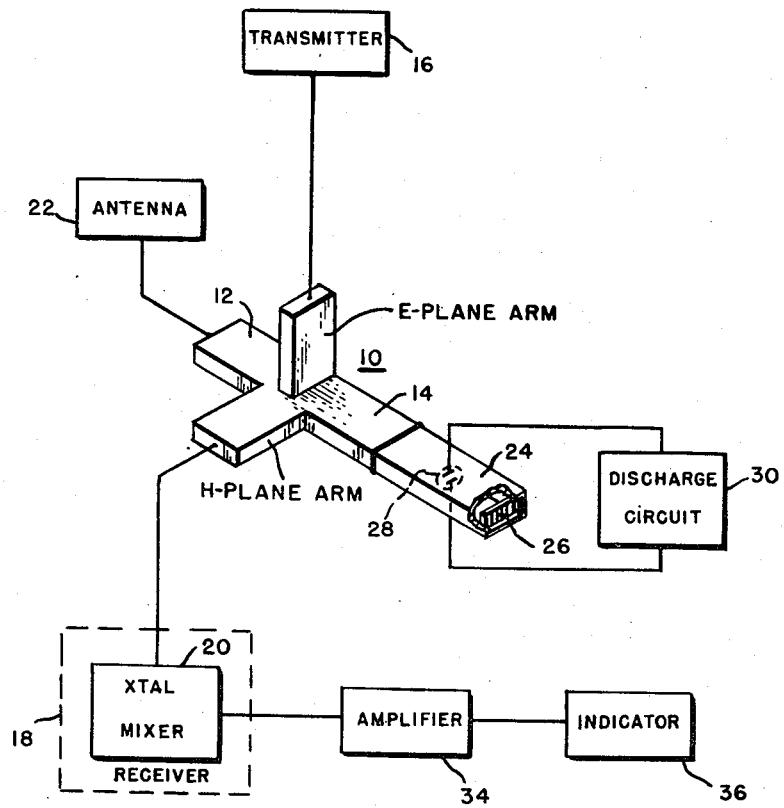
INVENTOR.
HAROLD ZWEIGBAUM
BY
*Harry M. Saragovitz*
ATTORNEY

United States Patent Office

2,699,547
Patented Jan. 11, 1955

2,699,547

SENSITIVITY DETERMINATION FOR DOPPLER TYPE RADAR SYSTEMS

Harold Zweigbaum, Perth Amboy, N. J., assignor to the United States of America as represented by the Secretary of the Army Application August 7, 1953, Serial No. 373,068

4 Claims. (Cl. 343—17.7)

(Granted under Title 35, U. S. Code (1952), sec. 266)

The invention described herein may be manufactured and used by or for the Government for governmental purposes, without the payment of any royalty thereon.

This invention relates to radar systems and more particularly to a field sensitivity check for radar systems utilizing the doppler effect.

It is well known that a source of waves moving with respect to an observer appears to that observer to have a frequency different from the emission frequency of this source by an amount dependent upon the velocity of the source relative to the observer. This doppler effect is utilized in radar systems to detect moving objects, and in such systems the receiver and transmitter are usually coupled to the antenna by means of a conventional hybrid junction known in the art as the Magic-T. A balanced system is usually provided by terminating one arm of the hybrid junction by a matched load. To assure that such a radar system is operating properly, it is desirable to periodically check the sensitivity of the system while it is in operation.

It is therefore an object of the present invention to provide a simple, yet adequate, sensitivity check for a doppler type radar system utilizing a hybrid junction.

It is another object of the present invention to provide a relative measurement of the sensitivity of a doppler type radar system utilizing a hybrid junction.

In accordance with the invention, means are provided for checking the overall sensitivity of a doppler type radar system including a Magic-T section having its E-plane arm coupled to a continuous wave transmitter; its H-plane arm coupled to the crystal mixer of a receiver; one side arm thereof coupled to the antenna; and the other side arm thereof coupled to a tuneable matching wave guide section terminated by a substantially non-reflective resistance load. The apparatus for checking the overall sensitivity of the radar system comprises means within the tuneable waveguide matching section intermediate the resistance load and said other side arm of the Magic-T for periodically shorting the electric field within the waveguide termination to produce a doppler frequency with respect to the transmitted frequency. Means are also included for detecting and indicating the difference beat frequency between the doppler frequency and the transmitted frequency. Under normal conditions, this doppler signal is of fixed intensity, and as long as the set is operating properly such difference frequency may be readily discerned. However, when the radar system is not operating properly, or the sensitivity thereof has decreased for any reason, the difference beat frequency can not be discerned.

For a better understanding of the present invention, together with other and further objects thereof, reference is had to the following description taken in connection with the accompanying drawing, and the scope will be pointed out in the appended claims.

In the drawing there is shown a block circuit diagram illustrating the invention.

Referring now to the drawing, there is shown a conventional doppler type radar system including at 10 a hybrid junction, hereinafter referred to as a Magic-T, having an E-plane arm, an H-plane arm and two co-linear side arms 12 and 14. Continuous wave transmitter 16 is coupled to the E-plane arm; receiver 18, which includes crystal mixer 20, is coupled to the H-plane arm; antenna 22 is coupled to side arm 12; and a tuneable matching waveguide termination 24, which includes end load resistor 26, is coupled to side arm 14. Waveguide termination 24 may be tuned by any suitable conventional means well known in the art. Centrally positioned within waveguide termination 24 intermediate load resistor 26 and side arm 14 there is provided a neon tube 28, or other suitable gaseous discharge device, having its electrodes connected across a conventional firing or discharge circuit 30 adapted to periodically discharge or fire tube 28, preferably at an audio rate. Tube 28 is so disposed that when it is discharged it provides a short circuit for the electric field within waveguide 24. Since firing circuits as represented by block 30 are well known in the art, a more detailed description thereof is not believed to be necessary. The output from the H-plane arm is coupled to crystal mixer 20, and the output therefrom is applied to indicator or detector 36 through amplifier 34. It is to be understood, of course, that indicator 36 may provide either an aural or visual indication.

In operation, with neon tube 28 in its quiescent state, waveguide termination 24 is tuned so that there is a slight mismatch in the system and, as a result, some continuous wave energy from transmitter 16 is permitted to leak into crystal mixer 20 through the H-plane arm of the Magic-T. The presence of the neon tube in its quiescent state is thus accounted for. When neon tube 28 is periodically fired, the firing action shorts the voltage field in waveguide termination 24 at a point different from load resistance 26. This disruption changes the voltage standing wave ratio within waveguide 24 and causes a doppler frequency with respect to the continuous waves from transmitter 16 present in both waveguide termination 24 and crystal mixer 20. This doppler frequency is also applied to crystal mixer 20 through the H-plane arm, and, consequently, results in a beat frequency signal at indicator 36, which as mentioned above, may either be an aural or visual indication. Under normal operating conditions, the receiver is tuned so that, when the neon tube is firing, there is barely a perceptible indication from amplifier 34. The intensity of the signal may be controlled by the amount of attenuation in termination waveguide 24 and by the gain control of amplifier 34. If, for any reason, the power output of transmitter 16 should decrease, or any part of the radar system decrease in sensitivity, then there will be no perceptable indication from the output of amplifier 34.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a doppler type radar system including a Magic-T having its E-plane arm coupled to a continuous wave transmitter and its H-plane arm coupled to the crystal mixer of a receiver, one side arm of said Magic-T being coupled to an antenna and the other side arm of said Magic-T being coupled to a tuneable waveguide matching termination having at one end thereof a resistance load adapted to absorb substantially all of the transmitted radio frequency energy directed toward said load, means for testing the overall sensitivity of said radar system comprising means within said waveguide intermediate said resistance load and said other side arm for periodically shorting the electric field within said waveguide to produce a doppler frequency with respect to the transmitted frequency, and means for detecting the difference frequency between said doppler frequency and said transmitted frequency.

2. In a doppler type radar system including a Magic-T having its E-plane arm coupled to a continuous wave transmitter and its H-plane arm coupled to the crystal mixer of a receiver, one side arm of said Magic-T being coupled to an antenna and the other said arm of said Magic-T being coupled to a tuneable waveguide matching termination having one end thereof a resistance load adapted to absorb substantially all of transmitted radio frequency energy directed toward said load, means for testing the overall sensitivity of said radar system comprising a gaseous discharge tube disposed within said waveguide section intermediate said resistance load and said other side arm, means for periodically discharging said gaseous discharge tube to produce a doppler frequency with respect to the transmitted frequency, and means for detecting the difference frequency between said doppler frequency and said transmitted frequency.

3. In a doppler type radar system including a Magic-T having its E-plane arm coupled to a continuous wave transmitter and its H-plane arm coupled to the crystal mixer of a receiver, one side arm of said Magic-T being coupled to an antenna and the other side arm of said Magic-T being coupled to a tuneable waveguide matching termination having at one end thereof a resistance load adapted to absorb substantially all of the transmitted radio frequency energy directed toward said load, means for testing the overall sensitivity of said radar system comprising a neon tube disposed parallel to the electric field within said waveguide section intermediate said resistance load and said other side arm, means for periodically discharging said neon tube to produce a doppler frequency with respect to the transmitted frequency, said doppler frequency being coupled simultaneously with said transmitted frequency to said crystal mixer to produce a beat frequency signal, and means for detecting said beat frequency signal.

4. The device set forth in claim 3, wherein said neon tube is periodically discharged at an audio rate.

References Cited in the file of this patent

UNITED STATES PATENTS

| | | |
|---|---|---|
| 2,596,531 | Clarke | May 13, 1952 |
| 2,611,125 | Dicke | Sept. 16, 1952 |